United States Patent
Canning et al.

(10) Patent No.: US 10,629,006 B2
(45) Date of Patent: Apr. 21, 2020

(54) WIRELESS SENSOR SYSTEM FOR A VEHICLE

(71) Applicant: DEFENCE INNOVATIONS IP PTY LTD, Mount Waverley, Victoria (AU)

(72) Inventors: Warren Peter Canning, Kyneton (AU); Daniel Lok-Kun Ho, Balwyn North (AU); Aaron Maher, Bentleigh East (AU); Igor Zakopaylo, Bentleigh East (AU); Dion Jaye Maher, Park Orchards (AU)

(73) Assignee: Defence Innovations IP Pty Ltd (AU)

( * ) Notice: Subject to any disclaimer, the term of this patent is extended or adjusted under 35 U.S.C. 154(b) by 296 days.

(21) Appl. No.: 15/565,148

(22) PCT Filed: Apr. 8, 2016

(86) PCT No.: PCT/AU2016/000122
§ 371 (c)(1),
(2) Date: Oct. 7, 2017

(87) PCT Pub. No.: WO2016/161474
PCT Pub. Date: Oct. 13, 2016

(65) Prior Publication Data
US 2018/0108188 A1    Apr. 19, 2018

(30) Foreign Application Priority Data
Apr. 8, 2015 (AU) .................... 2015901251

(51) Int. Cl.
*G07C 5/00* (2006.01)
*B64D 45/00* (2006.01)
(Continued)

(52) U.S. Cl.
CPC ............. *G07C 5/008* (2013.01); *B64D 45/00* (2013.01); *B64F 5/60* (2017.01); *G07C 5/0816* (2013.01);
(Continued)

(58) Field of Classification Search
CPC .... G07C 5/008; G07C 5/0841; G07C 5/0816; B64F 5/60; B64D 45/00;
(Continued)

(56) References Cited

U.S. PATENT DOCUMENTS 8,964,708 B2 * 2/2015 Petite .................... G01V 1/364
370/338
2007/0093974 A1  4/2007 Hoogenboom
(Continued)

*Primary Examiner* — Mary Cheung
(74) *Attorney, Agent, or Firm* — Galbreath Law Offices, P.C.; John A. Galbreath

(57) ABSTRACT

The invention is a wireless sensor and telemetry system for use on a vehicle such as an aircraft including at least one sensor node, a gateway, a user control system, data management and analytics means, wherein the sensor node is capable of sensing at least one type of operational performance or structural condition parameter data for the vehicle. Sensor node is attached to the vehicle in a specific location so that the data acquired gives information to the users of the system that relates to the operational performance or structural condition of the vehicle during operation. The sensor node wirelessly transmits the data it acquires to the gateway. The user control system enables person/s, to remotely operate and control the wireless sensor and telemetry system, by sending wireless operational control instructions to the system either via the gateway or directly to a particular sensor node or to a cluster of sensor nodes.

18 Claims, 5 Drawing Sheets

(51) Int. Cl.

|  |  |
|---|---|
| *B64F 5/60* | (2017.01) |
| *H04L 29/08* | (2006.01) |
| *G07C 5/08* | (2006.01) |
| *H04Q 9/00* | (2006.01) |
| *H01Q 1/28* | (2006.01) |
| *G01S 19/13* | (2010.01) |
| *H04W 84/18* | (2009.01) |
| *H04W 88/16* | (2009.01) |

(52) U.S. Cl.
CPC ............ *G07C 5/0841* (2013.01); *H04L 67/12* (2013.01); *H04Q 9/00* (2013.01); *B64D 2045/0085* (2013.01); *G01S 19/13* (2013.01); *H01Q 1/283* (2013.01); *H04W 84/18* (2013.01); *H04W 88/16* (2013.01)

(58) Field of Classification Search
CPC .......... B64D 2045/0085; H04W 88/16; H04W 84/18; H04L 67/12; H01Q 1/283; H04Q 9/00; G01S 19/13
See application file for complete search history.

(56) References Cited

U.S. PATENT DOCUMENTS

| 2009/0243895 | A1* | 10/2009 | Mitchell | ................ | H01Q 1/007 |
|---|---|---|---|---|---|
|  |  |  |  |  | 340/971 |
| 2010/0302071 | A1* | 12/2010 | Mattei | .................... | G07C 5/008 |
|  |  |  |  |  | 340/945 |
| 2011/0119024 | A1* | 5/2011 | Nam | ....................... | G01S 5/021 |
|  |  |  |  |  | 702/150 |
| 2012/0188057 | A1* | 7/2012 | Green | .................... | H04L 67/12 |
|  |  |  |  |  | 340/8.1 |

* cited by examiner

WIRELESS SENSOR SYSTEM FOR A VEHICLE

FIELD OF THE INVENTION

This invention relates to a wireless sensor system, for use on high performance vehicles such as aircraft, that includes a plurality of sensor nodes of various types and on-board data collection, storage, transmission, command and control and system integrity checking systems. In particular, the wireless sensor system is able to be self-powered, and attached to, or removed from, the high performance vehicle, with a minimum of vehicle downtime, and without causing any damage to the external surface coating of the vehicle.

BACKGROUND OF THE INVENTION

High performance vehicles, for example high performance aircraft and aircraft undergoing testing and research and development, require a reliable, accurate and robust sensor and telemetry system in order to provide real-time operational condition feedback of the measurement data collected by the sensors. This data may be sent as continuous telemetry and/or collected in a central data collection unit for subsequent downloading. Alternatively, the data collected may be stored within the sensor itself, and subsequently transmitted to the central data collection unit at a specific time. Or it may be required to collect data individually from each sensor using a portable computer.

One problem associated with current sensing systems for high performance vehicles is that current commercially available non-wired sensors are large and bulky. This severely limits the locations where such non-wired sensors can be installed upon and/or within the vehicle.

Another major problem with wireless sensors is that none of the commercially available ones can reliably communicate in real-time over long distances at a sufficient data transfer rate. The more extreme the operational parameters of the vehicle become, such as speed, component stress, altitude and the like, so too does the problem of being able to send and receive real-time data transmissions. The problem is exacerbated when the number of sensors fitted to the vehicle is increased.

To overcome these problems, current sensors typically require wiring to at least provide power to the sensor, and typically also to provide a path for the data acquired by the sensor to be sent to a separate data logger at a sufficient data transfer rate.

However, on certain types of vehicles, such as aircraft for example, the fitting of wired sensors can take weeks, or even months to install and commission. This adds significantly to the cost, both direct and indirect, related to having such a high value asset out of commission during the fitting and commissioning phases.

To overcome these problems, ideally it would be preferable to use suitable wireless sensors that are certified for use on both the exterior and interior surfaces of an aircraft, but currently these do not exist. Because of their bulk, the existing types of wireless sensors for use on aircraft can only be installed at limited interior structural locations of the aircraft. This typically requires disassembly of aircraft structures to provide the necessary access for installation and removal of the wireless sensor(s). The same problem thereby arises. There is a substantial direct and indirect cost associated with having an expensive asset, such as an aircraft, out of commission for an extended period of time. It also requires highly qualified specialist aircraft engineers to perform the task of aircraft disassembly, and re-assembly, plus the need to have the aircraft re-certified for flight after the re-assembly has been completed.

Further to this, no existing sensor system that is currently available can be directly mounted onto coated external aircraft surfaces, and subsequently removed, without damage to the aircraft coating. Removal of the original coatings to enable sensor installation, and the subsequent repair required, also add significant time and cost. For example, all currently available strain sensors require the strain gauge sensor itself to be mounted directly onto cleaned bare metal surfaces. Strain gauge sensors are typically very fragile and therefore require specialised technicians to install.

Traditional wired sensors may be smaller than their non-wired counterparts, but when wired sensors have the advantage with size, they have the disadvantage of adding the weight of the associated wiring that is required for them to operate. It is not uncommon for an installed system to consist of several kilograms of wiring. Most often, the aircraft structure needs to be permanently modified to accommodate the sensing system and its associated equipment and wiring. When an aircraft is modified in this way, it often needs to have its airworthiness re-certified. Airworthiness certification is both time consuming and very costly.

Also, modified aircraft often become "orphan aircraft" because of their unique modified structures and require individualised maintenance and sustainment plans which are costly and inefficient, thereby making them a burden on aircraft maintenance resources and scheduling. All this substantially increases the cost and time associated with acquiring real time flight performance data, both in direct costs, and in the ancillary costs surrounding specialised maintenance and recertification.

Dedicated test aircraft are also known as "orange wired" aircraft. As modern aircraft, particularly high performance aircraft and aerospace vehicles, continue to become significantly more expensive, many national defence budgets are unable to afford the significant costs associated with new generations of dedicated test aircraft. Orange wired aircraft are significantly more expensive than regular aircraft. Due to this significant extra cost, both in acquiring and maintaining them, they are often minimally used to preserve their integrity, and to reduce their wear and tear, and to keep the aircraft within its airworthiness lifespan for as long as possible. This type of special treatment often means that there is a disconnect between the flight characteristics of an orange wired aircraft over that of a regular aircraft of the same make and model. The data acquired from the operation of orange wired aircraft may not be truly representative of the operations of the entire regular fleet. Furthermore, only acquiring data from one particular aircraft means that the amount of data collected is somewhat limited and may have an undesirable impact on any engineering analysis of that data. Furthermore, sensors that are placed on an aircraft, and especially those placed on the outside of aircraft, particularly on any of its wings and/or flight control surfaces, require flight safety certification.

In addition to the aforementioned problems, stealth is now a major design consideration in many designs of military aircraft, particularly high performance military aircraft. Two critical factors that directly relate to the stealthiness of a particular aircraft design are its shape and the type of coating on the skin of the aircraft. Many advanced coatings have either been developed already, or are under development, that provide a high level of RADAR signal absorption, and this coating cannot be either removed or damaged in relation to the installation of, or removal of, any of the sensors and/or its ancillary equipment. Furthermore, the installation of the sensors and/or its ancillary equipment cannot significantly alter the shape of the aircraft so that its stealth performance is compromised in any way.

Very high performance vehicles, such as aircraft, require a large variety of flight characteristic parameters to be monitored. As the performance of these vehicles increases with each generation designed and manufactured, the number of parameters requiring sensor data increases. However, no existing sensor system that measures a wide multitude of parameters within one single sensor package is currently available commercially for aircraft testing applications. Examples of the types of parameters that need to be sensed, often at multiple locations on the aircraft's airframe, include acceleration, strain, temperature, humidity, pressure, inertia, and magnetic fields. Currently, should a user require the measurement of a large number of parameters at one single location, they have to install multiple sensor units at that location. This contributes to increased bulk, weight, and power requirements. Moreover, none of the currently available sensor systems are suitable for use on external surfaces of an aircraft during flight. This includes
a) Subsonic flight
b) Transonic flight
c) Supersonic flight Current sensor systems in use are configured while the aircraft is on the ground. Because of the complexity involved in system configuration procedures, and the lack of a suitable interface, they cannot be easily reprogrammed, or the measured data quickly analysed in real-time by the flight crew during the flight. This is particularly the case in single or two seat aircraft that lack a dedicated team of test engineers on-board, solely responsible for the management of the sensor system, and evaluation of the data obtained.

It is therefore an object of the current invention to provide a novel and inventive sensor and associated telemetry system for high performance vehicles, such as an aircraft, or an aerospace vehicle, that at least ameliorates some of, or all of, the aforementioned problems.

DISCLOSURE OF THE INVENTION

Accordingly, the present invention is a wireless sensor and telemetry system for use on a vehicle such as an aircraft including:
  at least one sensor node, and
  a gateway, and
  a user control system, and
  data management and analytics means, wherein the at least one sensor node is capable of sensing at least one type of operational performance or structural condition parameter data for the vehicle, and the at least one sensor node is attached to the vehicle in a specific location so that the data it acquires gives useful and valuable information to the users of the system that relates to the operational performance or structural condition of the vehicle during the vehicle's operation. The at least one sensor node is capable of wirelessly transmitting the data it acquires to the gateway. The user control system enables a person, or persons, to remotely operate and control the wireless sensor and telemetry system, by sending wireless operational control instructions to the system either via the gateway, or directly to a particular sensor node, or to a cluster of sensor nodes.

Preferably the gateway is capable of receiving operational control signals and thereby configuring the wireless sensor and telemetry system in accordance with the received operational control signals, and the gateway is capable of alerting a person, or persons, if any one of the at least one sensor node, or the gateway itself, is no longer capable of functioning within acceptable operational parameters. The gateway is capable of receiving the acquired data from all the sensor nodes in the system, and it is capable of storing that acquired data or streaming that acquired data via a telemetry system, either continuously, or in batches, to a person or persons within the vehicle, or remote from the vehicle.

In another aspect of the present invention, the gateway includes:
  sensor node control and data communication means, and
  data storage memory means, and
  data communication and telemetry means,
  accurate time keeping means, and
  GPS system, and
  remote user interface, and
wherein the gateway has a unitary body with an autonomous power supply. The gateway is capable of controlling and communicating with any or all of the sensor nodes in the system, and transferring data to and from any of the sensor nodes in the system via the sensor node control and data communication means. The data storage memory means is capable of centrally and securely storing the sensor data acquired by the sensor node, and is capable of either continuously transmitting that acquired data via the telemetry system, or transmitting it in batches. The accurate time keeping means provides central time synchronisation to the entire system, including all the sensor nodes, and the gateway itself, so that all recorded events and other information acquired by the operation of the system are accurately logged and date stamped for the purposes of data management and analysis. The GPS system continuously monitors the position of the vehicle and works in conjunction with the accurate time keeping means so that relevant recorded events and other information acquired by the operation of the system include accurate position co-ordinates for the purposes of data management and analysis. The remote user interface enables a person or persons to manage the operation of the wireless sensor and telemetry system, and the person or persons may be located either within or remote from the vehicle.

In another aspect of the invention, the sensor node comes in a variety of shapes, sizes and weights, and may include one or more sensors within the node that are each capable of acquiring a specific type of data relating to the operational performance of, or structural condition of, the vehicle. The appropriate sensor node type is selectable from a range of available sensor nodes so that the sensor node can be attached to the vehicle either internally to the vehicle's frame, or upon the outer skin of the vehicle, depending upon the particular types(s) of operational performance and/or structural condition of the vehicle that is being monitored by the sensor(s) in the sensor node.

Preferably the sensor nodes that are selected from the range of available sensor nodes, for use on any of the control surfaces of the vehicle, feature light weight and a low profile construction, so as to not significantly interrupt the operational performance of the vehicle during its operation.

Preferably each of the sensor nodes used in the system works in conjunction with fastening means that is designed so that the particular sensor node type can be attached to, and removed from, the vehicle without damaging the vehicle's outer surface, or its frame, and wherein the fastener means enables each sensor type to be fastened to, or removed from, the vehicle within an acceptable amount of time, without the need for special tools, or for the vehicle to be moved to a specialised installation location.

Preferably each sensor node type includes wireless data transmission and receiving means, and these means enable the particular sensor node to operate in accordance with specific operational instructions given to it from the gateway, or directly from a remote management system, and to transmit the sensor data it acquires while in use, to the gateway, or directly to the remote management system.

Preferably each sensor node type has an autonomous power supply.

Preferably each sensor node is capable of determining in real time what the most appropriate sensor within the node is at any particular time during the operation of the vehicle so that the best quality data can be acquired by that sensor node at any given time.

Preferably each sensor node is able to self-calibrate its sensors and report any sensor that is not functioning within acceptable performance parameters as pre-set, or subsequently set, by the operator of the system.

Preferably each sensor node is modular, thereby allowing an operator to provision a sensor node with at least one sensor type, so that the node is capable of acquiring a pre-determined set of sensor data that conforms with the type of test(s) being conducted during the operation of the vehicle.

Preferably each sensor node will include heating means so that the temperature of the sensors within the node does not drop below a set minimum temperature.

Optionally at least one of the types of sensor nodes that is selectable from the range of sensor nodes includes a flexible body that enables the sensor to be shaped so that it closely conforms to the surface shape of the part of the vehicle to which it has been fastened. The types of surface include, by way of example, rotating shafts, external fuel tanks, and ordinance mounting and delivery systems.

Optionally the sensor data collection and analysis system includes a user interface within the crew cabin, such as the cockpit on an aircraft, and this data collection and analysis system is usable by the on-board operators of the vehicle.

Preferably both the user interface within the crew cabin, and any external remote user interface, includes a graphical user interface.

Preferably the remote management user interface for the onboard sensor system and telemetry includes at least one computer wherein a remote operator or operators can wirelessly communicate with, and manage the operation of, the sensor and telemetry system using the at least one computer, and wherein the remote management system allows the remote operator or operators to communicate directly with the gateway, and/or each sensor node in the sensor and telemetry system.

Preferably the remote management system manages all aspects of the operation of the sensor and telemetry system, including, but not limited to:

a. the sampling rate per sensor or sensor node, and/or
b. the synchronisation of sensors, and/or
c. sensor and/or sensor node naming and clustering, and/or
d. the sampling program, and/or
e. the acceptable operational parameters per sensor and/or sensor node, and/or
f. system events handling, and/or
g. the data transmission rates, and/or
h. the power output, and/or
i. the RF frequencies used for data transfers within the system and the telemetry system and other wireless communication parameters, and/or
j. the data storage parameters including formats and encryption to be used, and/or
k. the data transmission formats and interface speeds, and/or
l. the system power, including power supply status for all sensor nodes in the system, or individual sensors, and the gateway, and/or
m. providing error and alert monitoring for all sensor system components
n. memory utilization.

Preferably the system is able to communicate wirelessly in real-time on up to 150 channels in deployed sensor nodes simultaneously, as well as accepting live streaming data from these nodes at sample rates suitable for high performance vehicle testing.

Preferably the system is able to buffer data in the event of a loss of wireless communications, and transmit the buffered data when wireless communication resume, while maintaining data integrity. In one preferred embodiment of the invention, the sensor system shall be connected to the vehicles power supply system.

In an alternative embodiment, the power supply for at least a part of the sensor system is autonomous.

Preferably each sensor node used in the system is able to be attached directly onto a coated surface of the vehicle, and the attachment means enables the installation and removal of each sensor node to or from the surface without damaging the integrity of the coated surface.

Preferably at least one of the sensor node types shall be capable for use while mounted to an external surface of the vehicle during operation at supersonic speeds up to Mach 2.

In another preferred aspect, the present invention includes a method of providing a sensor and telemetry system to a vehicle including the steps of:

selecting at least one suitable wireless sensor node from a plurality of sensor node types, wherein each sensor node type is adapted to house at least one type of sensor, and affixing the selected sensor node to a suitable location on a vehicle's body, either internally or upon the outer surface of the vehicle, and providing a gateway that receives real-time sensor data wirelessly from the at least one sensor node, and providing a user control system that enables a user, who is either remotely located from the vehicle, or is an occupant of the vehicle, to send wireless command and control signals to the sensor node, or to a particular sensor type housed within the sensor node.

Preferably the method includes a step of enabling the gateway to condition monitor the operational performance of the system, including each of the sensor nodes, and the sensor types housed within each one, the status of the wireless sensor real-time data transmission, so that an alert may be generated if any of the components within the system is no longer capable of functioning within acceptable operational parameters. Preferably the method includes a step of providing the gateway with storage means that enables the gateway to store the acquired data it receives from the sensor nodes, and wirelessly streaming it, either in batches, or continuously, to a user of the system, or to store the acquired data, in the event of a loss of wireless communications between the gateway and the user interface, and resume the data transmission once the communication link is restored.

Preferably the method includes a step of providing the system with an accurate GPS and time keeping system so that all data acquired has its associated location and time data recorded in the system.

Preferably the method includes a step of providing at least one type of sensor node with a deformable housing that thereby allows a user to deform the housing to make the sensor node as low profile as possible, and to enable the shape of the deformation to closely match the contours of the surface upon which the sensor node is affixed.

Preferably the method includes a step of providing a fastening means that is adapted to enable a sensor node to be affixed to, and subsequently removed from, a surface on the vehicle, without either degrading the surface material, or any coating applied thereto, and without the need for special tools, or for the need to move the vehicle to a specialized installation or removal location.

Preferably the method includes a step of providing the system with an autonomous power supply system.

Preferably the method includes a step of providing the system with the wireless transmission means to enable up to 150 channels in deployed sensor nodes to communicate wirelessly and simultaneously in real-time.

DETAILED DESCRIPTION OF THE PREFERRED EMBODIMENTS

It must be noted that an aircraft has been chosen purely as an example of a suitable type of high performance vehicle. Any type of high performance vehicle is suitable for this invention.

Figure 1:
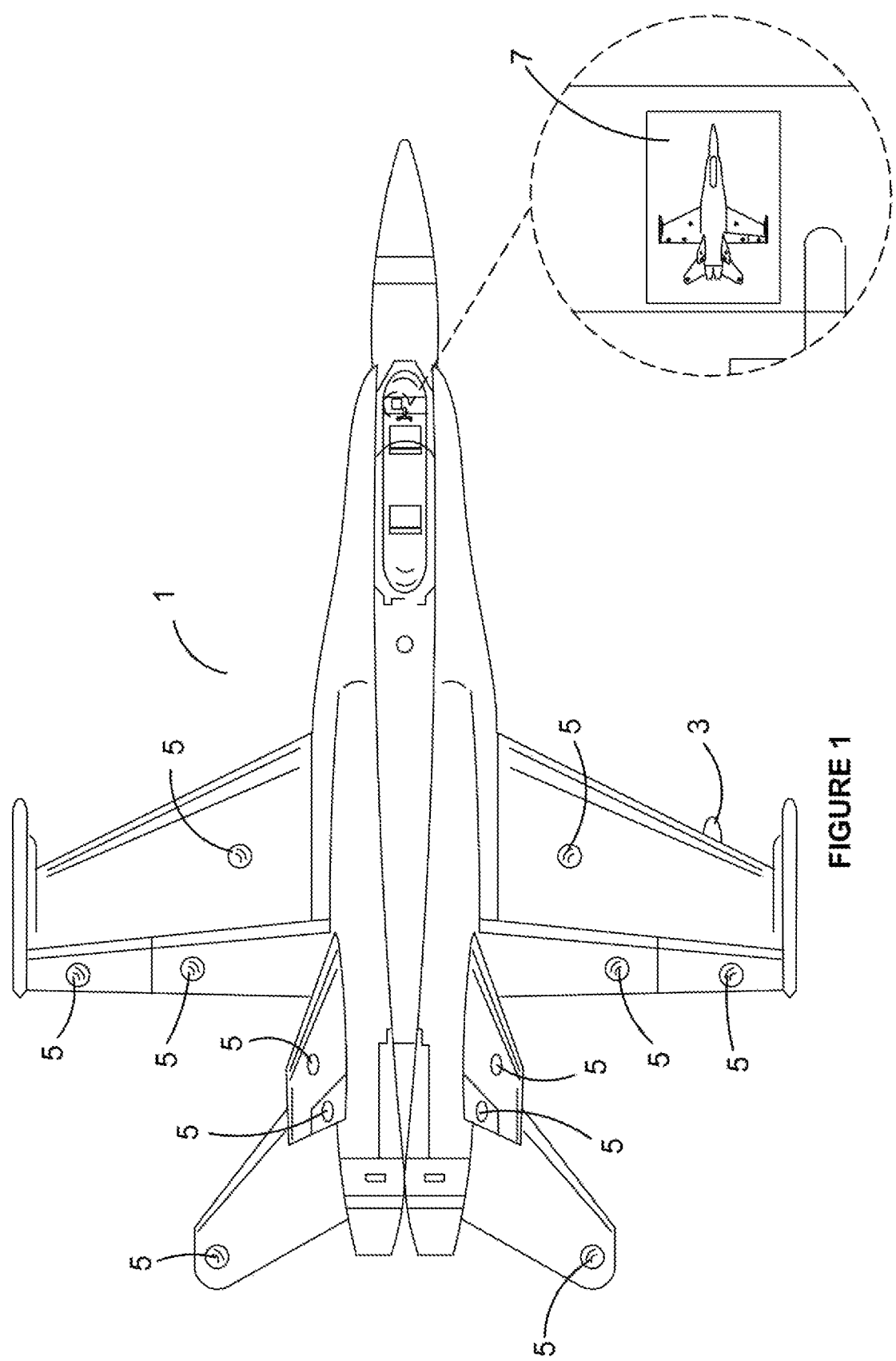
FIG. 1 is a top view of a typical high performance vehicle with an array of sensors and ancillary equipment installed in accordance with the present invention.

In FIG. 1, we can see a schematic of the wireless sensor and telemetry system that is the subject of the present invention. to We can see the top view of an aircraft 1 that includes a gateway 3, in this embodiment carried under starboard wing, and a plurality of sensor nodes 5. The gateway 3 and each sensor node 5 is wirelessly connected together for two-way data communication. This two-way communication may be directly between an individual sensor node 5 and the gateway 3, or a cluster of sensor nodes 5 and the gateway 3. In this view we are also shown a cockpit mounted sensor system monitoring and management interface 7.

Figure 2:
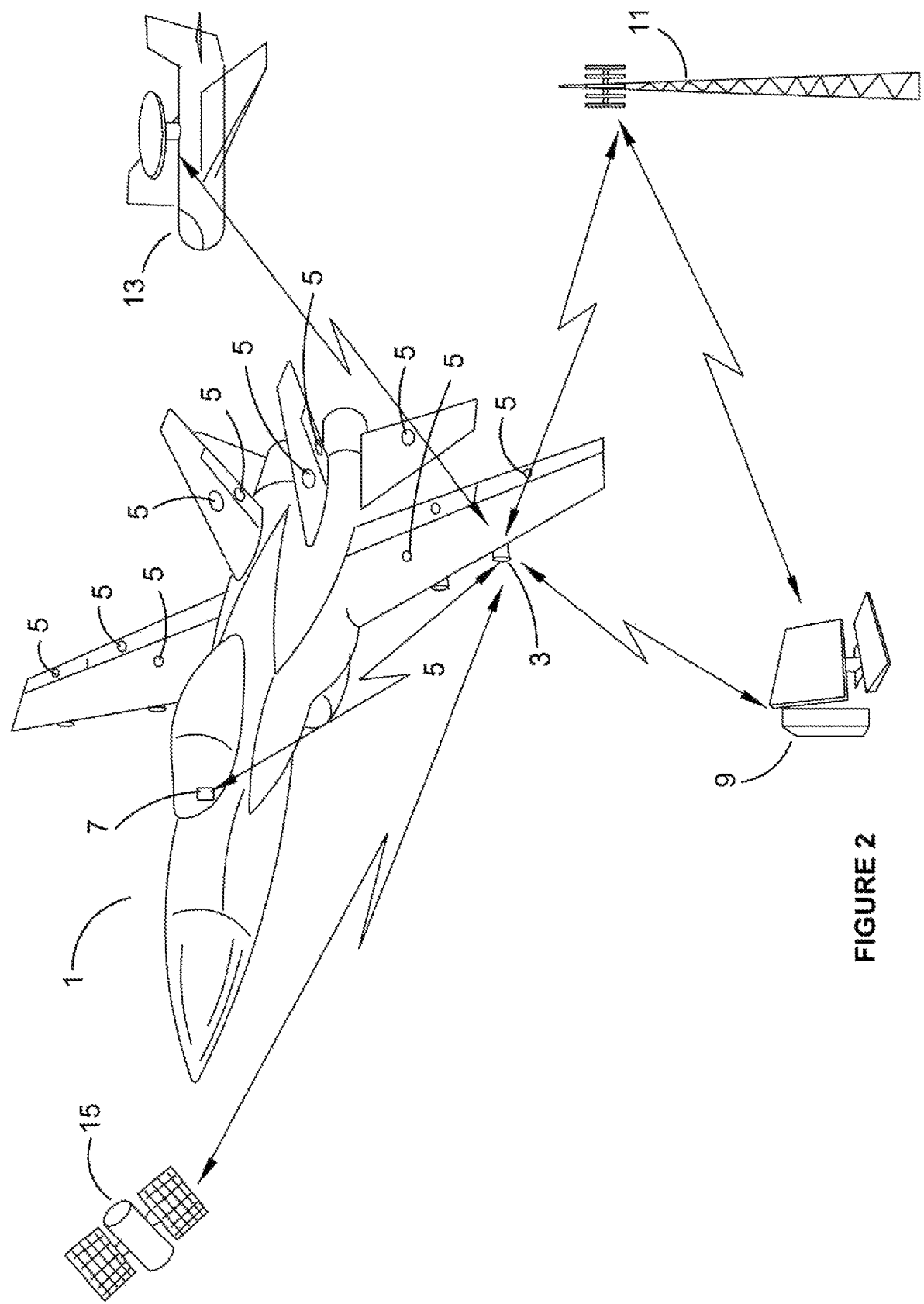
FIG. 2 is a schematic view of a typical vehicle, in this example an aircraft, in flight and showing the wireless data communications.

In FIG. 2 we are shown another schematic of the overall sensor system. The aircraft 1 has a plurality of sensor nodes 5 fitted to strategic positions on the airframe and on flight control surfaces. Each sensor node, and/or clusters of sensor nodes are in two-way wireless communication with the sensor gateway 3, this time located under the port wing of the aircraft. The sensor gateway 3 is designed to fit to a standard ordinance/equipment mounting point on the aircraft's airframe. The sensor gateway 3 is in two-way wireless communication with the cockpit mounted management interface 7, and with at least one remote monitoring and sensor system management interface 9 that is located remotely from the aircraft. The remote management interface 9 can be any suitable computer device, such as a personal computer, tablet or other mobile computing device. The two-way communication between the sensor gateway 3 and the remote management interface 9 can be direct, or where the distance between the aircraft 1 being tested, and the remote interface 9 is too great to make direct communication practical, then the signal can be relayed via at least one of ground base relay stations 11, and/or a nearby relay aircraft 13, or an orbiting satellite 15.

The two-way data communication allows either the pilot and/or remote monitoring personnel to adjust the condition of the sensor system and at least some of the sensor nodes. The logic control means within the sensor gateway 3 is able control the operation of each of the sensor nodes 5. Such control signals may be to switch the sensor from a low power mode to high power mode for example, or it may turn sensors off when they are not needed to preserve power to the sensor node 5 or the sensor gateway 3. In another example, either of the management interfaces 7 or 9 may change the sensor frequency during different phases of the flight test so that more useful data can be obtained and analyzed. The monitoring and management interfaces 7 and 9 are each capable of receiving system error messages, and receiving alerts when any of the sensors within the system go outside of acceptable performance parameters. Furthermore, authorised personnel monitoring the system remotely can also transmit software and firmware updates to the system, even while the aircraft is in flight.

Figure 3:
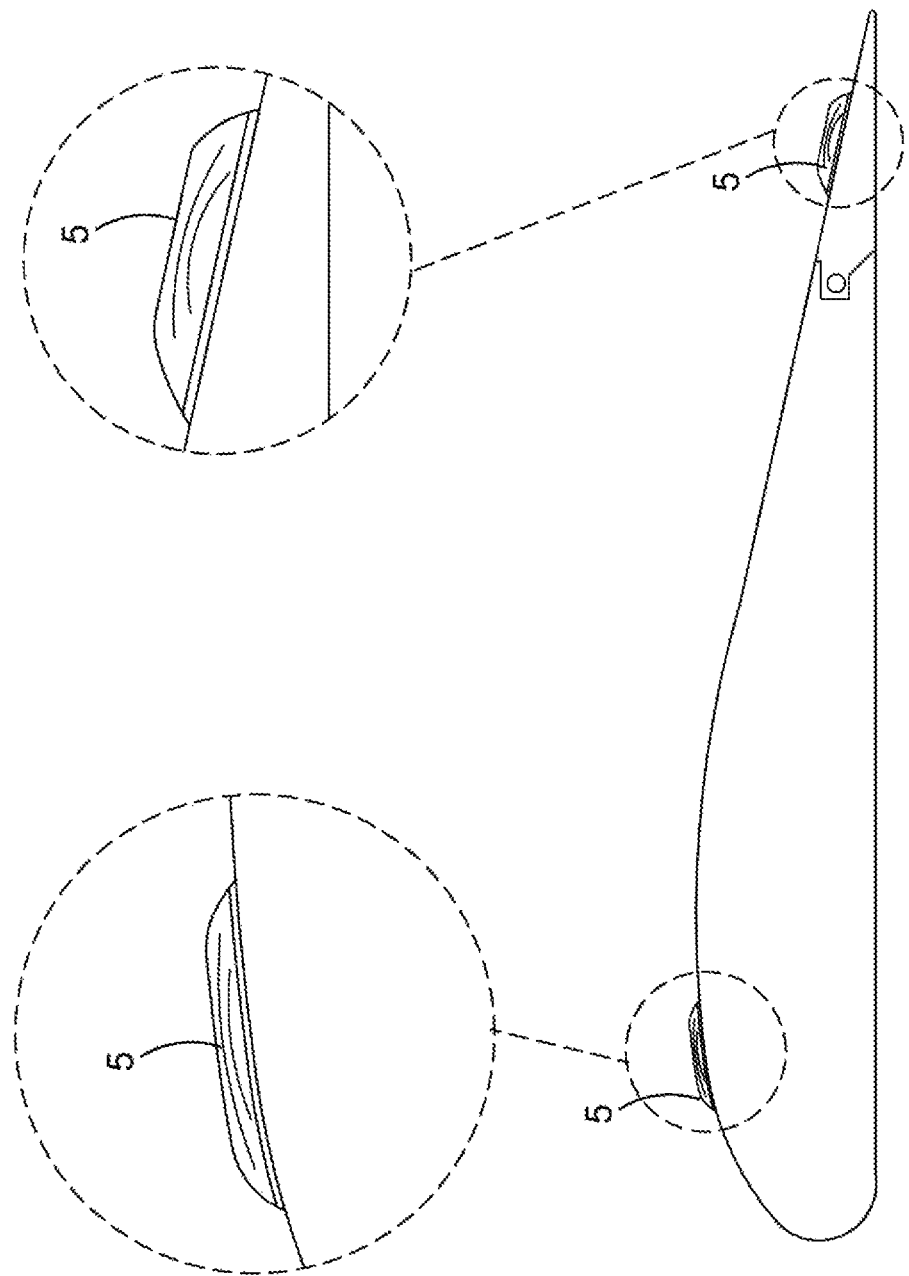
FIG. 3 is a schematic of a couple of sensors attached to the leading edge of an aircraft wing, and also a sensor attached to the surface of a control surface for the aircraft.

Turning to FIG. 3, we can see some illustrations of a typical sensor node 5 that are shown by way of example here on the leading edge of a wing, or on a control surface of the aircraft. Sensor nodes 5 that may be used in high velocity and/or high load locations, particularly on high performance aircraft, may be housed in a package that is able to be deformed into a shape that provides the sensor node 5 with minimal disruption to the airflow across the airframe, wing or control surface. In this way, each sensor node 5 can be manipulated by the installer so that it closely conforms with the contour of the portion of the aircraft onto which it is applied.

Additionally, similar sensor nodes may be housed in a deformable package that allows them to be attached to other types of moving parts on a vehicle. The deformation of the housing enables the sensor node to have a low profile that conforms to the surface contours of the object it is affixed to. Examples of such moving parts include, by way of example only, a blade, or blades, of a rotary wing aircraft, or a drive shaft, or an axle on a high performance automobile.

Figure 4:
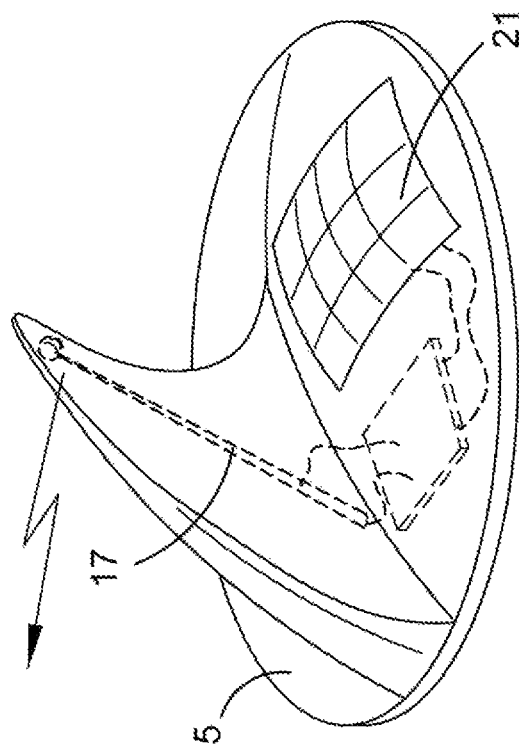
FIGS. 4-7 are various embodiments of a wireless sensor nodes used in conjunction with the wireless sensor system.
Figure 5:
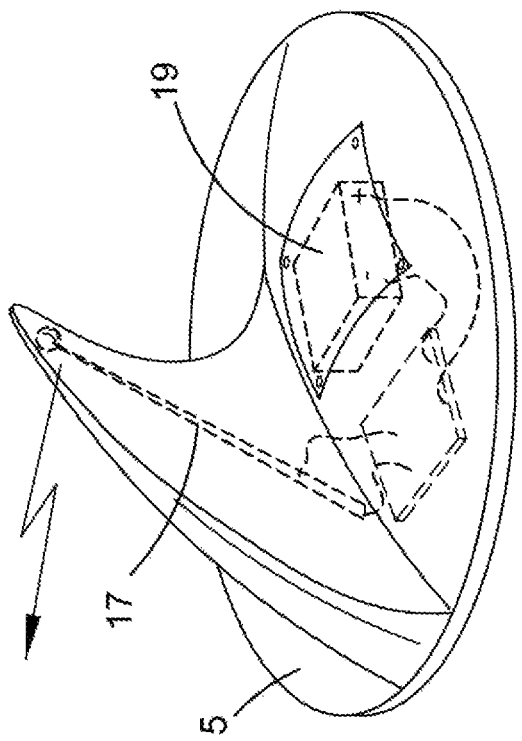
Figure 7:
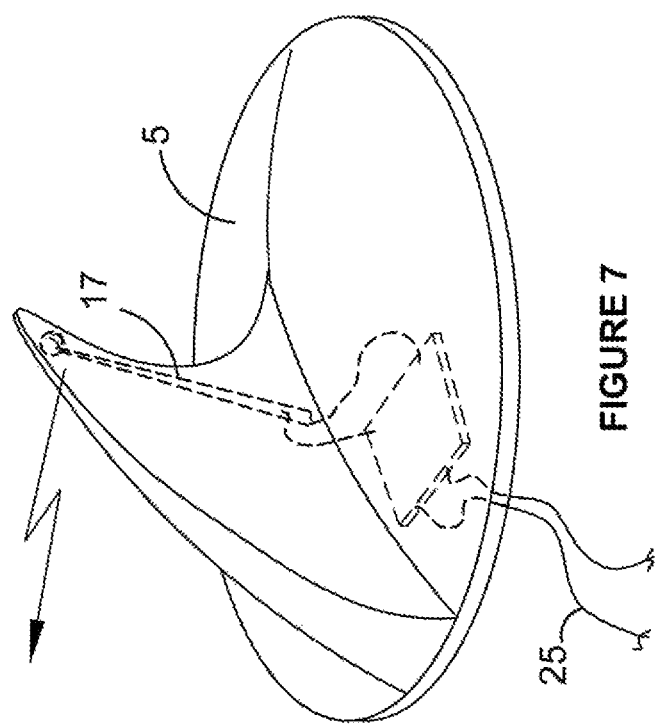
Figure 6:
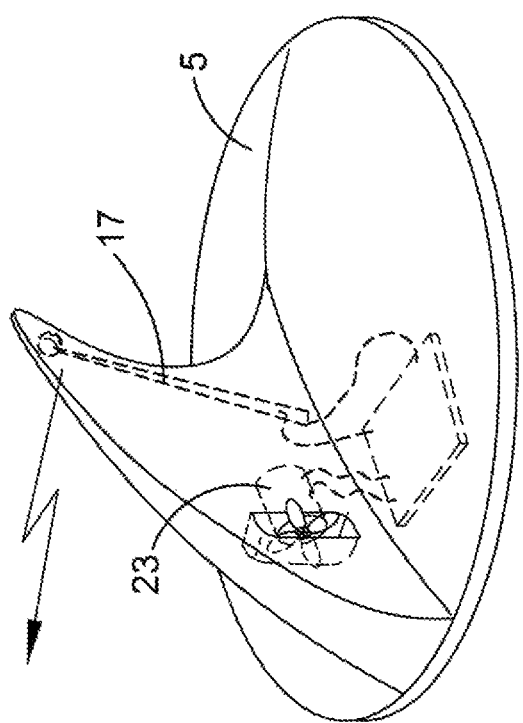

Finally turning to FIGS. 4 to 5, we see a variety of illustrations of possible sensor node designs. In FIG. 4 we are shown one embodiment wherein the sensor node 5 includes an antenna 17 that enables the two-way wireless communication, as well as a sensor node battery 19. In FIG. 5, the battery has been replaced by a solar panel 21. In FIG. 6, we are shown another form of one aspect of the invention wherein the power supply for the sensor node 5 is provided by a wind turbine 23. Finally, in some installation, it may be possible for the sensor node 5 to be wired into the aircrafts power supply system via wires 25.

While the above description includes the preferred embodiments of the invention, it is to be understood that many variations, alterations, modifications and/or additions may be introduced into the construction and arrangement of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A wireless sensor and telemetry system for use on a vehicle such as an aircraft, including:
   at least one sensor node, and
   a gateway, and
   a user control system, and
   data management and analytics means,
   wherein the at least one sensor node is capable of sensing at least one type of operational performance or structural condition parameter data for the vehicle, and the at least one sensor node is attached to the vehicle in a specific location so that the data it acquires relates to the operational performance or structural condition of the vehicle during the vehicle's operation, and wherein the at least one sensor node is capable of wirelessly transmitting the data it acquires to the gateway, and wherein the user control system enables a person, or persons, to remotely operate and control the wireless sensor and telemetry system, by sending wireless operational control instructions to the system either via the gateway, or directly to a particular sensor node, or to a cluster of sensor nodes; wherein each sensor node has an autonomous power supply and each sensor node includes a fastening means whereby each sensor node can be attached to and removed from the vehicle without damaging the vehicle's outer surface or its frame.

2. The wireless sensor and telemetry system as defined in claim 1 wherein the gateway is capable of receiving operational control signals and thereby configuring the wireless sensor and telemetry system in accordance with the received operational control signals, and the gateway is capable of alerting a person, or persons, if any one of the at least one sensor node, or the gateway itself, is no longer capable of functioning within acceptable operational parameters, and wherein the gateway is capable of receiving the acquired data from all the sensor nodes in the system, and it is capable of storing that acquired data or streaming that acquired data via a telemetry system, either continuously, or in batches, to a person or persons within the vehicle, or remote from the vehicle.

3. The wireless sensor and telemetry system as defined in claim 2 wherein the gateway includes:
   sensor node control and data communication means, and
   data storage memory means, and
   data communication and telemetry means,
   accurate time keeping means, and
   a GPS system, and
   a remote user interface, and
   wherein the gateway has a unitary body with an autonomous power supply, and is capable of controlling and communicating with any or all of the sensor nodes in the system, and transferring data to and front any of the sensor nodes in the system via the sensor node control and data communication means, and wherein the data storage memory means is capable of centrally and securely storing the sensor data acquired by the sensor node, and is capable of either continuously transmitting that acquired data via the telemetry system, or transmitting it in batches, and wherein the accurate time keeping means provides central time synchronisation to the entire system, including all the sensor nodes, and the gateway itself, whereby all recorded events and other information acquired by the operation of the system is accurately logged and date stamped for the purposes of data management and analysis, and wherein the GPS system continuously monitors the position of the vehicle, and works in conjunction with the accurate time keeping means, whereby relevant recorded events and other information acquired by the operation of the system includes accurate position co-ordinates for the purposes of data management and analysis, and wherein the remote user interface enables a person or persons to manage the operation of the wireless sensor and telemetry system, and the person or persons may be located either within or remote from the vehicle, or a combination of both.

4. The wireless sensor and telemetry system as defined in claim 3 wherein the user interface used by a crew on-board the vehicle, or any external remote user interface, includes a graphical user interface.

5. The wireless sensor and telemetry system as defined in claim 3 wherein the remote user interface for the on-board sensor system and telemetry system includes at least one computer, and wherein a remote operator or operators can wirelessly communicate with, and manage the operation of, the sensor and telemetry system using the at least one computer, and wherein the remote user interface allows the remote operator or operators to communicate directly with the gateway, or each sensor node in the sensor and telemetry system.

6. The wireless sensor and telemetry system as defined in claim 5 wherein the remote user interface enables the management of all aspects of the operation of the sensor and telemetry system, including, but not limited to:
   a. the sampling rate per sensor or sensor node, and/or
   b. the synchronisation of sensors, and or
   c. sensor and/or sensor node naming and clustering, and/or
   d. the sampling program, and/or
   e. the acceptable operational parameters per sensor and/or sensor node, and/or
   f. system events handling, and/or
   g. the data transmission rates, and/or
   h. the power output, and/or
   i. the RF frequencies used for data transfers within (lie system and the telemetry system and other wireless communication parameters, and/or
   j. the data storage parameters including formats and encryption to be used, and/or
   k. the data transmission formats and interface speeds, and/or
   l. the system power, including power supply status for all sensor nodes in the system, or individual sensors, and the gateway, and/or
   m. providing error and alert monitoring for all sensor system components, and/or
   n. memory utilisation.

7. The wireless sensor and telemetry system as defined in claim 1 wherein each sensor node includes wireless data transmission and receiving means, and these means enable the particular sensor node to operate in accordance with specific operational instructions given to it from the gateway, or directly from a remote management system, and to transmit the sensor data it acquires while in use, to the gateway, or directly to the remote management system.

8. The wireless sensor and telemetry system as defined in claim 1 wherein at least one of the sensor nodes, includes a flexible body.

9. The wireless sensor and telemetry system as defined in claim 1 wherein each sensor node is able to self-calibrate each of the sensors associated with it and report any sensor that is not functioning within acceptable performance parameters as pre-set or subsequently set by the operator of the system.

10. The wireless sensor and telemetry system as defined in claim 1 wherein each sensor node is modular, thereby allowing an operator to provision a sensor node with at least one sensor type, whereby the node is capable of acquiring a pre-determined set of sensor data that conforms with the type of test(s) being conducted during the operation of the vehicle.

11. The wireless sensor and telemetry system as defined in claim 1 wherein the system is able to buffer data in the event of a loss of wireless communications, and transmit the buffered data when wireless communication resume, while maintaining data integrity.

12. The wireless sensor and telemetry system as defined in claim 1 wherein the sensor system is powered by the vehicle's power supply system.

13. The wireless sensor and telemetry system as defined in claim 1 wherein the sensor system is autonomously powered, with respect to the vehicle's power supply system.

14. The wireless sensor and telemetry system as defined in claim 1 wherein at least one of the sensor node types is suitable for use while mounted to an external surface of the vehicle; during operation at supersonic speeds up to Mach 2.

15. A method of providing a sensor and telemetry system to a vehicle including the steps of:
    selecting at least one suitable wireless sensor node from a plurality of sensor node types, wherein each sensor node type is adapted to house at least one type of sensor, and wherein each sensor node has an autonomous power supply, and
    affixing the selected sensor node to a suitable location on a vehicle's body, either internally or upon the outer surface of the vehicle via a fastener, and
    providing a gateway that receives real-time sensor data wirelessly from the at least one sensor node, and
    providing a user control system that enables a user, who is either remotely located from the vehicle, or is an occupant of the vehicle, to send wireless command and control signals to the sensor node, or to a particular sensor type housed within the sensor node, and
    enabling the gateway to condition monitor the operational performance of the system, including each of the sensor nodes, and the sensor types housed within each one, the status of the wireless sensor real-time data transmission, whereby an alert may be generated if any of the components within the system is no longer capable of functioning within acceptable operational parameters, and
    providing the gateway with storage means that enables the gateway to store the acquired data it receives from the sensor nodes, and wirelessly streaming it, either in batches, or continuously, to a user of the system, or to store the acquired data, in the event of a loss of wireless communications between the gateway and the user interface, and resume the data transmission once the communication link is restored, and
    providing the system with art accurate GPS and time keeping system whereby all data, acquired has its associated location and time data recorded in the system.

16. The method as defined in claim 15 further including a step of providing at least one type of sensor node with a deformable housing that thereby allows a user to deform the housing, and to enable the shape of the deformation to closely match the contours of the surface upon which the sensor node is affixed.

17. The method as defined in claim 15 further including the step of providing the system with an autonomous power supply system.

18. The method as defined in claim 15 further including a step of providing the system with the wireless transmission means to enable up to 150 channels in deployed sensor nodes to simultaneously wirelessly communicate in real-time.

* * * * *